United States Patent [19]
Michie

[11] Patent Number: 5,398,033
[45] Date of Patent: Mar. 14, 1995

[54] WEATHER RADAR AXONOMETRIC DISPLAY MODE IMPLEMENTATION

[75] Inventor: Terry K. Michie, Olathe, Kans.

[73] Assignee: AlliedSignal Inc., Morris Township, Morris County, N.J.

[21] Appl. No.: 197,906

[22] Filed: Feb. 17, 1994

[51] Int. Cl.⁶ ............................................. G01S 13/95
[52] U.S. Cl. ................................ 342/26; 342/180
[58] Field of Search .................... 342/26, 180, 181

[56] References Cited

U.S. PATENT DOCUMENTS

| | | |
|---|---|---|
| 4,855,939 | 8/1989 | Fitzgerald, Jr. et al. ............ 364/522 |
| 4,940,987 | 7/1990 | Frederick ............................ 342/26 |
| 5,049,886 | 9/1991 | Seitz et al. .......................... 342/26 |
| 5,198,814 | 3/1993 | Sushjara .............................. 342/26 |
| 5,202,690 | 4/1993 | Frederick ............................ 342/26 |
| 5,262,773 | 11/1993 | Gordon ........................... 342/26 X |

Primary Examiner—Mark Hellner
Attorney, Agent, or Firm—Howard G. Massung

[57] ABSTRACT

A horizontal plan view and a vertical side view of a weather disturbance are combined into a single axonometric display to facilitate analysis of the disturbance. Desired azimuth and elevation angles for the center of the axonometric display and which of the four quadrants of the display to be emphasized are user selectable. Either the plan view or the side view can be separately displayed in the axonometric format and the axonometric display is user selectable with the conventional display being readily available.

19 Claims, 7 Drawing Sheets

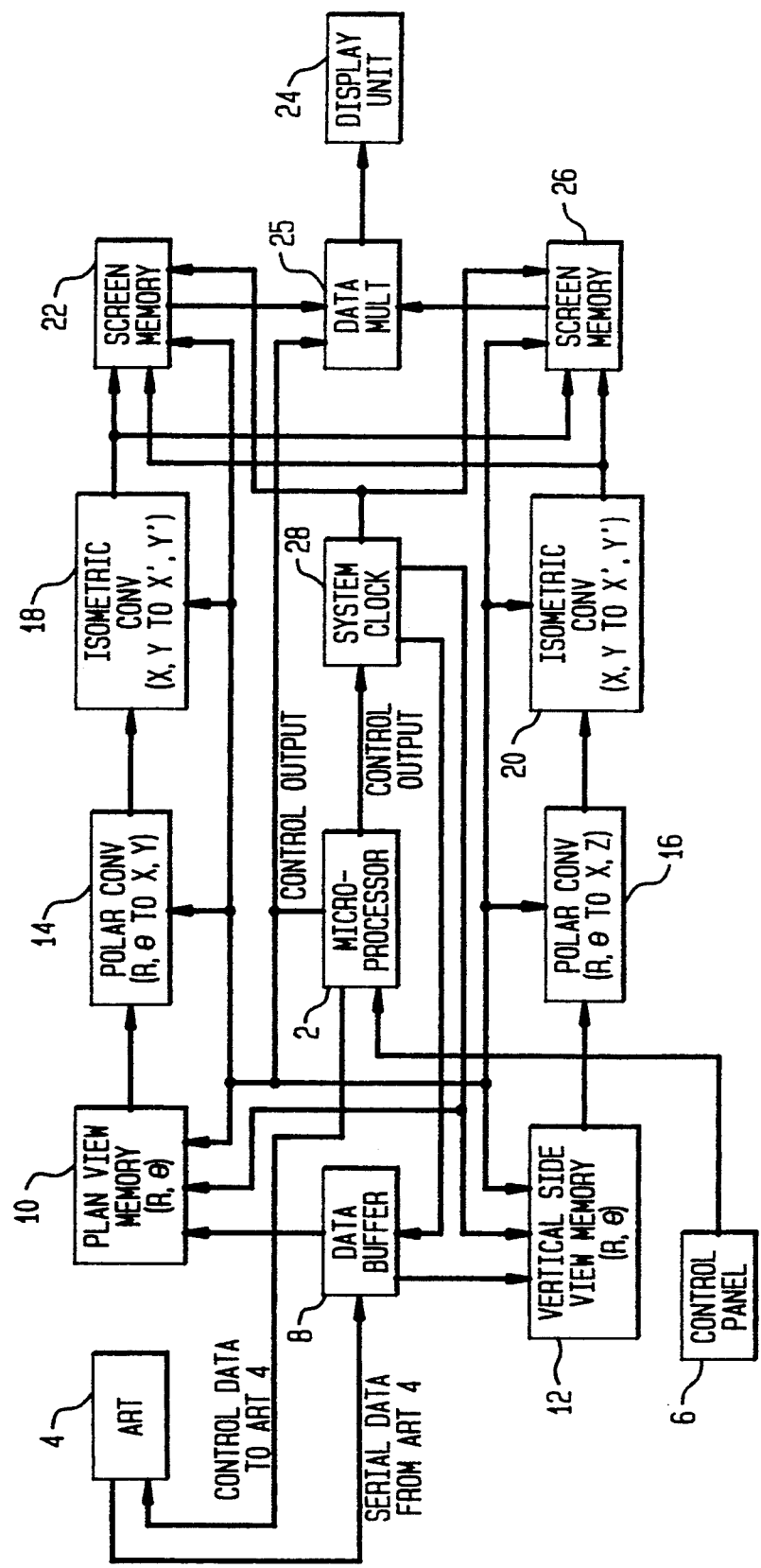

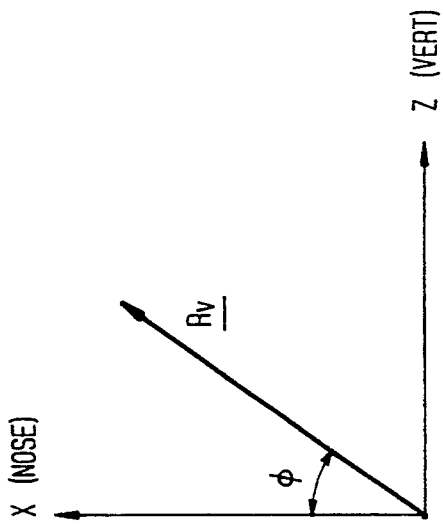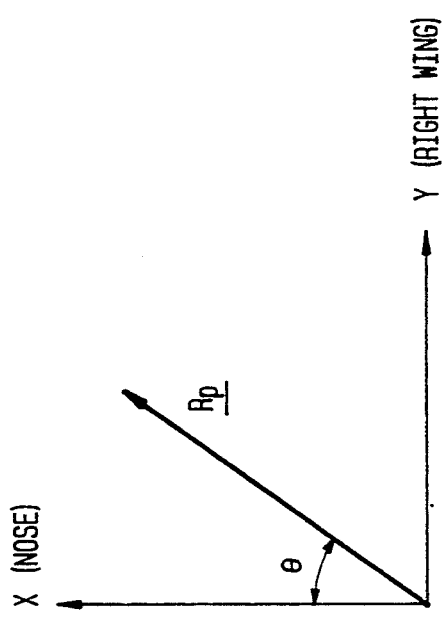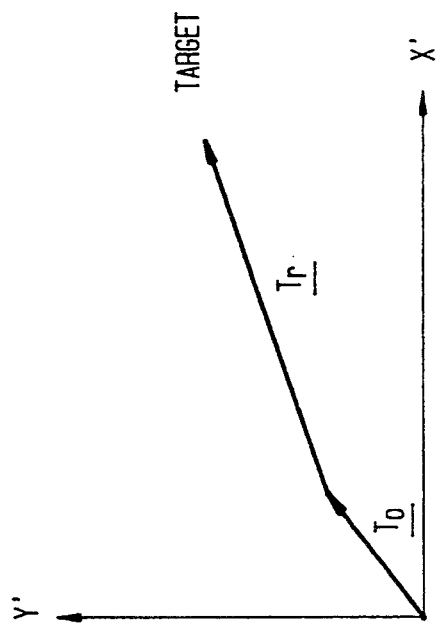

WEATHER RADAR AXONOMETRIC DISPLAY MODE IMPLEMENTATION

BACKGROUND OF THE INVENTION

This invention relates generally to the weather disturbance analysis features of a weather radar display. More particularly, this invention relates to a weather radar display mode implementation which displays horizontal and vertical scans in an axonometric format for weather disturbance analysis purposes. Still more particularly, this invention relates to a weather radar system display mode implementation which enhances the ability of a user to simultaneously correlate the horizontal and vertical components of a weather disturbance to facilitate analysis of the disturbance.

Users of weather radar systems have different requirements, depending upon the particular application of the system. For example, users of weather radar systems for marine or small aircraft applications are typically interested in detection and avoidance of threatening weather disturbances. Users of such systems for land based and medium to large aircraft applications are interested in both detection and analysis of weather disturbances.

The intent of weather disturbance analysis is to issue warnings in the case of land based applications, and to make decisions to fly through or around the disturbance in the case of airborne applications. To assess the threat of a weather disturbance, both reflectivity, which relates to rainfall rate, and storm height need to be analyzed. The user needs substantial training and experience to be able to make an accurate analysis. In the case of airborne radar systems, pilot workload is a very important consideration in the design of the system. Pilots of high performance aircraft are often faced with selecting the least hazardous route and flying that route. This issue is magnified in a situation where a weather disturbance is combined with the need to approach and land at an airport. In these situations the weather radar system is a tool to facilitate analysis of the disturbance.

Conventional weather radar systems provide the user with either a plan position view or a vertical profile view on the radar system display.

The plan position view is a view looking down, with the radar system antenna scanning horizontally at a particular elevation angle. The coordinates are range and bearing. The elevation angle is generally available as a manual control to the user.

The vertical profile view shows a vertical slice at a particular bearing as viewed from the side. The coordinates are range and height.

A significant problem exists in correlating the plan position and vertical profile views to analyze weather disturbances.

The disadvantages of conventional weather radar system displays for the aforenoted purpose include: (1) a single horizontal or vertical view is the only view available at any given time; (2) it takes user skill to correlate the two views; and (3) continual switching between views as is necessary adds to user workload.

U.S. Pat. No. 4,940,987 (U.S. Class 342/26) which issued to Frederick on Jul. 10, 1990 provides for two simultaneous views of the weather disturbance, i.e. a plan view and a vertical side or frontal view. The net effect of this approach is to view a weather disturbance with two intersecting planes. One plane is the horizontal plan view, while the other plane is user selectable to be a vertical slice along the range axis, or a vertical slice perpendicular to the range axis. The vertical slices can be adjusted for their thickness so that, for example, a frontal view represents an integration of the data from a range "a" to a range "b". The disadvantages of this approach are: (1) the user must mentally correlate the two views; (2) the frontal view has a very long update rate; and (3) the radar system must have substantial hardware (memory) to support this approach.

U.S. Pat. No. 5,198,819 (U.S. Class 342/26) which issued to Susnjara on Mar. 30, 1993 teaches storing multiple plan views in their own display memories. The views are then displayed in an overlapping fashion, with only the highest of the stored views shown in true rainfall intensities. The concept of storage of multiple plan views suffers from a long lag time to fill all memory planes. Each horizontal scan usually takes several seconds to complete. Even if the currently scanned view is continuously updated, the displayed complete view has data that can be almost a minute old. This problem is especially evident when the vehicle carrying the radar system (such as an aircraft) changes heading. The overlapped views can be dangerous in that low altitude features of a weather disturbance can be overlooked. Also this concept is costly in that a memory plane is needed for all plan views. Finally, the display unit is complex and not readily available in current weather radar systems.

U.S. Pat. No. 3,044,058 (no class indicated) which issued to Harris on Jul. 10, 1962 implements an isometric display on a cathode ray tube (CRT). The purpose of the Harris invention is to show the spatial relationship of various targets relative to the user. The antenna in the Harris arrangement scans a volume, not two intersecting planes, with location of the target (aircraft, ship, etc.) being of prime importance, rather than the analysis of the internal content of a weather disturbance. The use of a CRT is an integral part of the Harris invention, whereas the intent of the present invention is to use a generic display device. Accordingly, Harris is seen to significantly differ from the present invention.

SUMMARY OF THE INVENTION

It is an object of this invention to provide a weather radar display mode implementation which combines a horizontal plan view with a vertical side view into a single axonometric display of a weather disturbance.

It is another object of this invention to allow a user to select the desired azimuth and elevation angles for the center of the axonometric display.

It is still another object of this invention to allow the user to select which of the four quadrants of the display is emphasized.

It is yet another object of this invention to provide the capability to display either the horizontal plan view or the vertical side view separately in an axonometric format.

It is a further object of this invention to make the axonometric display user selectable such that activation is on demand when required, but with a conventional display being readily available.

It is also an object of this invention to provide a display of the type described that is easy to understand so as to minimize time for interpretation.

In accordance with the above objects a weather radar axonometric display mode implementation is contemplated, wherein a radar system antenna is controlled to scan a plan view at a prescribed tilt setting and then scan a vertical side view at a prescribed azimuth angle. This sequence is continually repeated unless a single view is desired. Weather intensity data is stored for each view in memories which are organized with a distance and angle format. The data for each view is translated to an x–y format and then translated to an axonometric format. The latter translated data is stored in a display memory for subsequent presentation on a display. The axonometric type of display greatly aids in correlating the two views (plan and vertical) of a weather disturbance. An important feature of the invention is that a user can analyze the content of the weather disturbance in three dimensions, i.e. bearing, height and range from one display, at a glance. In this regard, it is noted that the presentation is not a volume, but rather is two intersecting planes.

Although for purposes of illustrating and describing the invention an isometric display mode implementation used with an airborne weather radar system will be considered, it will be appreciated that the invention is not limited to such. It will first be understood that an isometric projection is a special class of axonometric projection that shows length along any of three axes as true length. Other projections can be used to emphasize one plane over the other. For example, a dimetric projection will result if the projection plane is equally inclined to two of the principle axes. When the projection plane is unequally inclined to all three principal axes, a trimetric projection results. A minor change in the axes translation determination can provide any of the projection types as will be readily appreciated.

It will next be understood that the invention can be readily adapted to marine or land based radar systems as well as airborne radar systems as illustratively described.

BRIEF DESCRIPTION OF THE DRAWINGS

FIG. 1 is a block diagram illustrating an implementation of a weather radar display mode according to the present invention.

FIGS. 2A–2C are graphical representations of the coordinate axes for a horizontal plane, a vertical plane, and an isometric display, respectively, as achieved by the implementation illustrated in FIG. 1.

DETAILED DESCRIPTION OF THE INVENTION

Figure 3:
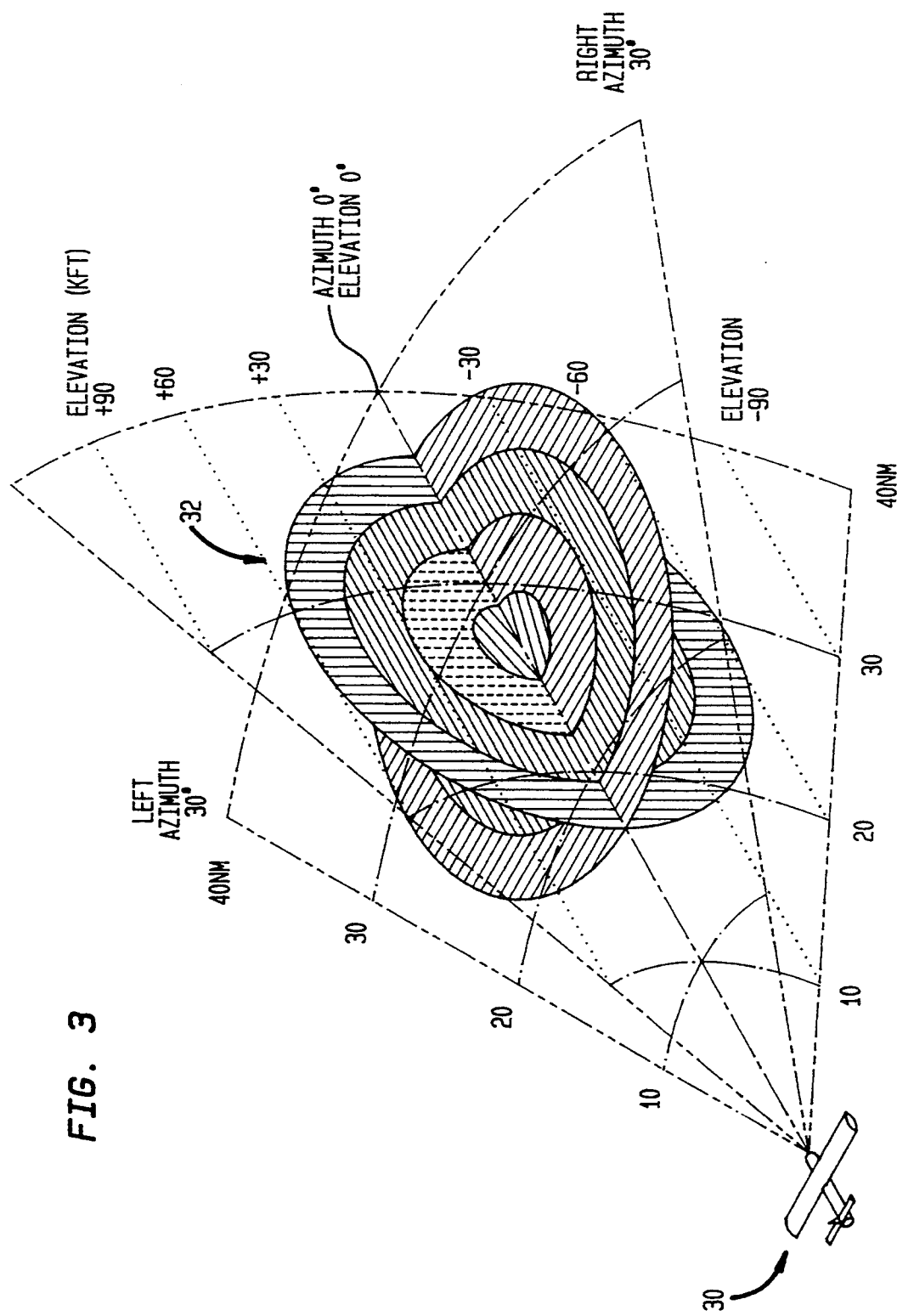
FIG. 3 is graphical representation of an isometric view of a generally spherical weather disturbance.
Figure 4B:
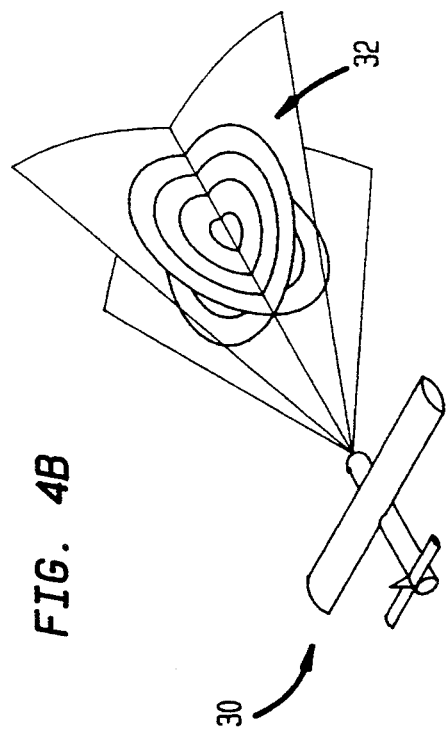
FIGS. 4A–4D are diagrammatic representations showing a typical presentation of four display quadrants available to a user of the invention.
Figure 4D:
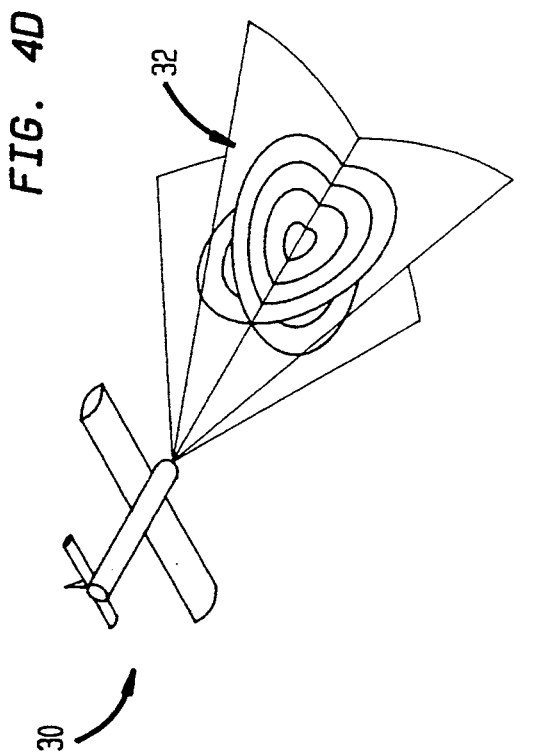
Figure 4A:
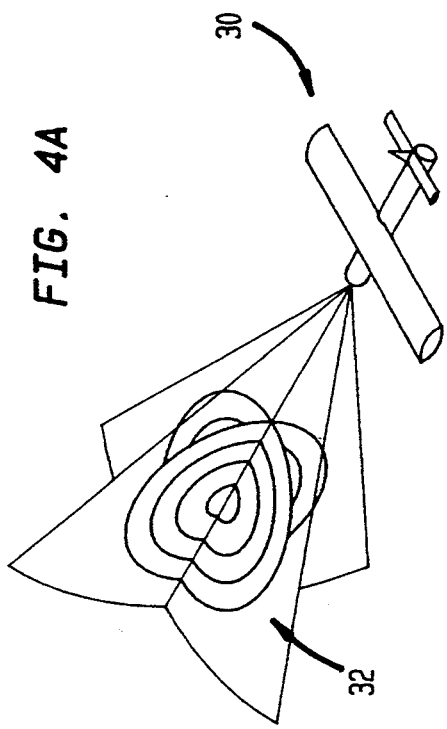
Figure 4C:
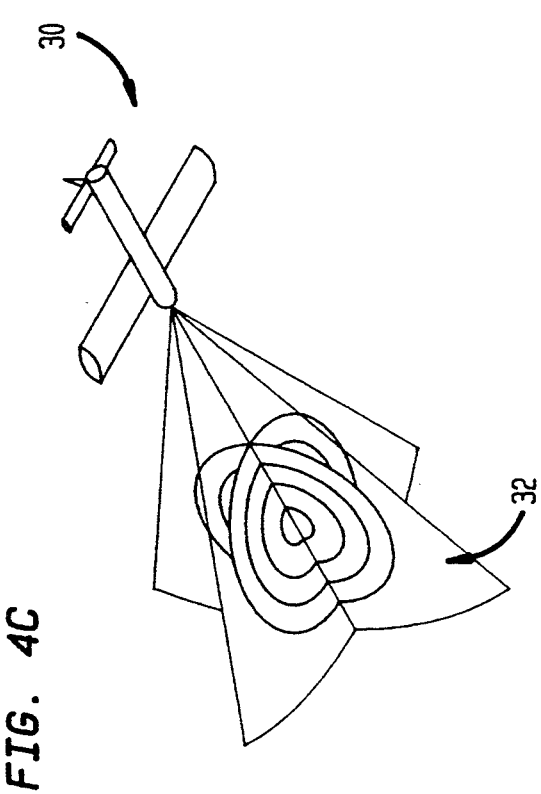

The display mode implementation of the invention shown in FIG. 1 features a central microprocessor 2 which controls the activation of an antenna/receiver/transmitter unit (ART) 4.

A control panel 6 senses the activation of, for purposes of example, a user selected isometric mode of operation as well as the particular view desired and controls microprocessor 2 accordingly. Microprocessor 2 transmits serial control data to ART 4. ART 4 responds by alternately scanning a horizontal plan view followed by a vertical side view of a target.

ART 4 transmits serial data containing target reflectivity for each of the views to a data buffer 8 for temporary storage in the data buffer at the rate of the serial transmission. The data is then transmitted to the appropriate memory, i.e. either a plan view memory 10 or a vertical view memory 12. These memories are organized in a distance and angle format (R and $\Theta$ or $\phi$) as indicated. This format makes it easy to select the appropriate angle segment for display.

A polar converter 14 for plan view memory 10 and a polar converter 16 for vertical view memory 12 convert the data from the respective memories from a distance and angle format (R, $\Theta$, $\phi$) to a rectangular (X, Y, Z) format. Following the polar conversion, a conversion to an isometric format (X', Y') is accomplished by an isometric converter 18 (plan view) and an isometric converter 20 (vertical view). The isometric conversion requires the rectangular coordinate system to be rotated such that the rectangular axes (X and Y) are 30 degrees relative to the isometric axes (X' and Y'). Converters 14, 16, 18 and 20 and memories 10 and 12 are controlled by microprocessor 2.

The data from isometric converters 18 and 20 are loaded for storage into a screen memory 22 controlled by microprocessor 2. For a full isometric display, the data from converters 18 and 20 must be loaded into screen memory 22 in a specific sequence. If, for example, the upper right hand quadrant of the display is to be emphasized, the left of center plan view data and below center vertical view data are loaded for storage first. Then the right of center plan view and above center vertical view data are loaded for storage. This allows the data for the emphasized view to over-ride the data for the hidden views.

The data in screen memory 22 is read by a display unit 24 via a data multiplexer 25 at the particular rate needed by a generic display unit. The display unit can be a cathode ray tube, liquid crystal display, or any such other generic display unit, and which display unit 24 is controlled by microprocessor 2.

A second screen memory 26 is likewise controlled by microprocessor 2 so that the data from the two views (plan and vertical) can be loaded into screen memory 26 while display unit 24 is being serviced by screen memory 22. The display unit is thus alternately updated by the two screen memories.

Data multiplexer 25 is controlled by microprocessor 2 to switch between the memories. Switching in this fashion prevents displaying a partially formed picture.

A system clock 28 is controlled by microprocessor 2 to provide the various clock frequencies needed by data buffer 8 and by memories 10, 12, 22 and 26.

Memories 10, 12, 22 and 26 are conventional random access memories (RAM's) and converters 14, 16, 18 and 20 are conventional gate arrays. The other components of the invention shown in FIG. 1 are likewise conventional in nature. Accordingly, the invention herein described resides in the arrangement of the components and not in the components themselves.

Polar converters 14 and 16 and isometric converters 18 and 20 have mathematical functions that are performed to create the isometric display which is displayed by display 24. The equations that are implemented by the converters are developed as will be indicated below.

FIGS. 2A–2C show the three coordinate axes needed to describe the generation of the isometric display. The horizontal plan view (FIG. 2A) shows a vector $R_p$ which lies in a plane described by the principal axes X (in the direction of the nose of an aircraft 30, for example, shown in FIGS. 3, 4A–4D, 5A–5B and 6A–6D), and Y in the direction of the right wing of aircraft 30.

The first step in creating the isometric display is to convert the radar parameters ($R_p$ and $\Theta$) to X and Y components (see FIGS. 1 and 2A). Vector matrix notation will be used to mathematically describe the conversions. A matrix will be identified as an underscored capital letter.

$$\underline{R_p} = \begin{bmatrix} X \\ Y \end{bmatrix}$$

evaluating, $$\underline{R_p} = \begin{bmatrix} R_p\cos\theta \\ R_p\sin\theta \end{bmatrix}.$$

The next step is to convert the X and Y components to the isometric view components X' and Y' (see FIGS. 1 and 2C).

$\underline{T_r} = \underline{A_p} \times \underline{R_p}$ where $\underline{A_p}$ is a conversion matrix, $$\underline{T_r} = \begin{bmatrix} \cos 30° & \cos 30° \\ \sin 30° & -\sin 30° \end{bmatrix} + \begin{bmatrix} R_p\cos\theta \\ R_p\cos\theta \end{bmatrix}.$$

The last step is to offset the origin of the isometric display by the vector $T_0$. This is accomplished by:

$$\underline{T} + \underline{T_r} + \underline{T_o}$$

evaluating, $$\underline{T} = \begin{bmatrix} \cos 30 & \cos 30° & R_p\cos\theta \\ \sin 30 & -\sin 30° & R_p\sin\theta \end{bmatrix} + \begin{bmatrix} X_0' \\ Y_0' \end{bmatrix} \text{where,}$$

$$\underline{T} = \begin{bmatrix} X' \\ Y' \end{bmatrix}.$$

The X' and Y' components can now be expanded as follows:

$X' = (\cos 30°)(R_p \cos \Theta) + (\cos 30°)(R_p \sin \Theta) + X'_o$, and $Y' = (\sin 30°)(R_p \cos \Theta) - (\sin 30°)(R_p \sin \Theta) + Y'_o$.

To create the vertical view portion of the isometric display, the coordinate axes for the vertical side view in FIG. 2B are first considered. In this view a vector $R_v$ lies in a plane described by X (in the direction of the aircraft nose) and Z (in a vertical direction). The radar derived parameters ($R_v$ and $\phi$) are first converted to X and Z components.

$$R_v = \begin{bmatrix} X \\ Z \end{bmatrix} \text{evaluating,}$$

$$R_v = \begin{bmatrix} R_v\cos\phi \\ R_v\sin\phi \end{bmatrix}.$$

The next step is to convert the X and Z components to the isometric view axes X' and Y' as shown in FIG. 2C:

$\underline{T_r} = \underline{A_v} \times \underline{R_v}$ where $\underline{A_v}$ is a conversion matrix, $$\underline{T_r} = \begin{bmatrix} \cos 30° & 0 \\ \sin 30° & 1 \end{bmatrix} \begin{bmatrix} R_v\cos\phi \\ R_v\sin\phi \end{bmatrix}$$

The last step is to offset the origin of the isometric display by the vector $T_o$. This is accomplished as follows:

$\underline{T} = \underline{T_r} + \underline{T_o}$ evaluating, $$\underline{T} = \begin{bmatrix} \cos 30° & 0 \\ \sin 30° & 1 \end{bmatrix} \begin{bmatrix} R_v\cos\phi \\ R_v\sin\phi \end{bmatrix} + \begin{bmatrix} X_0' \\ Y_0 \end{bmatrix} \text{where,}$$

$$\underline{T} = \begin{bmatrix} X' \\ Y' \end{bmatrix}.$$

The X' and Y' components can now be expanded as follows:

$X' = (\cos 30°)(R_v \cos \phi) + X'_o$, and $Y' = (\sin 30°)(R_v \cos \phi) + (R_v \sin \phi) + Y'_o$.

The above contemplates the coordinate conversion process for both the horizontal and vertical views.

FIG. 3 is illustrative of a typical isometric display presentation of a simulated weather disturbance such as 32. The display view is user selected via control panel 6 (FIG. 1) to emphasize the upper right quadrant. The simulated weather disturbance is spherical in shape with the shaded areas representing different reflectivity levels within the weather disturbance. Both the horizontal and vertical views are scanned ±30 degrees relative to a selected center line. The center line azimuth and elevation angle can be user selected to be at any angle within the azimuth and elevation sectors that ART 4 (FIG. 1) can scan. The display has range marks to measure distance and altitude marks to measure the height of weather disturbance 32.

FIGS. 4A–4D illustrate that the isometric view can be oriented to view weather disturbance 32 in four different angles. The four views are such that the upper left (FIG. 4A), upper right (FIG. 4B), lower left (FIG. 4C) and lower right (FIG. 4D) quadrants are emphasized. This capability gives the user the ability to view the contents of the weather disturbance in the most optimal orientation.

Figure 5A:
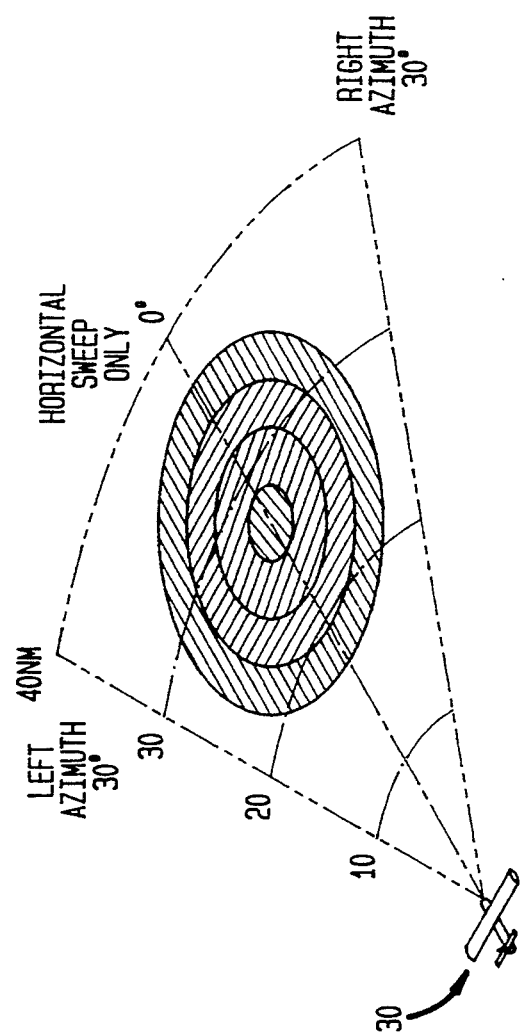
FIGS. 5A–5B are graphical representations showing a typical isometric display presentation of horizontal and vertical views, respectively.
Figure 5B:
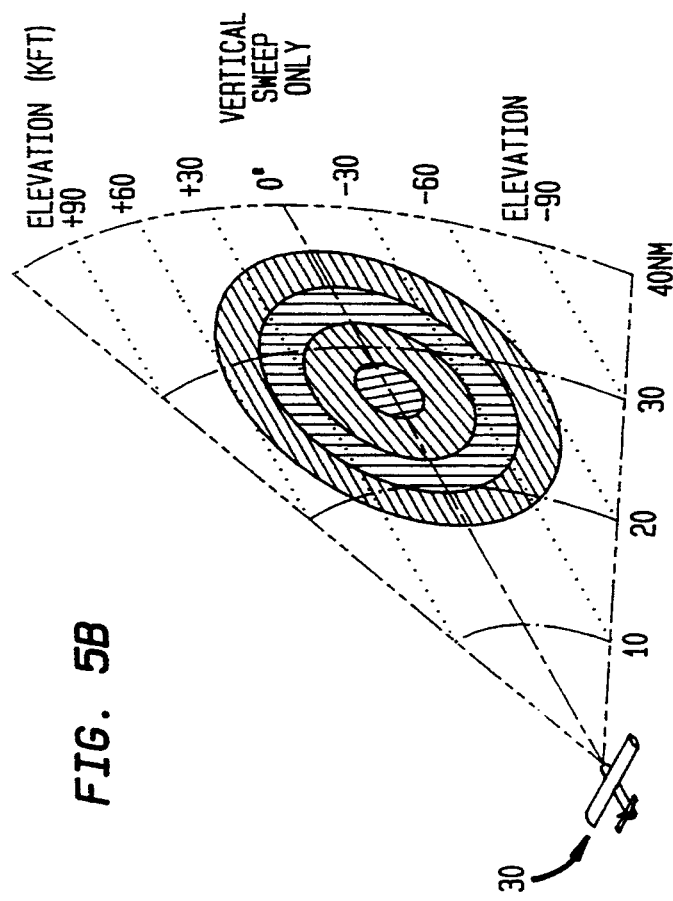
Figure 6A:
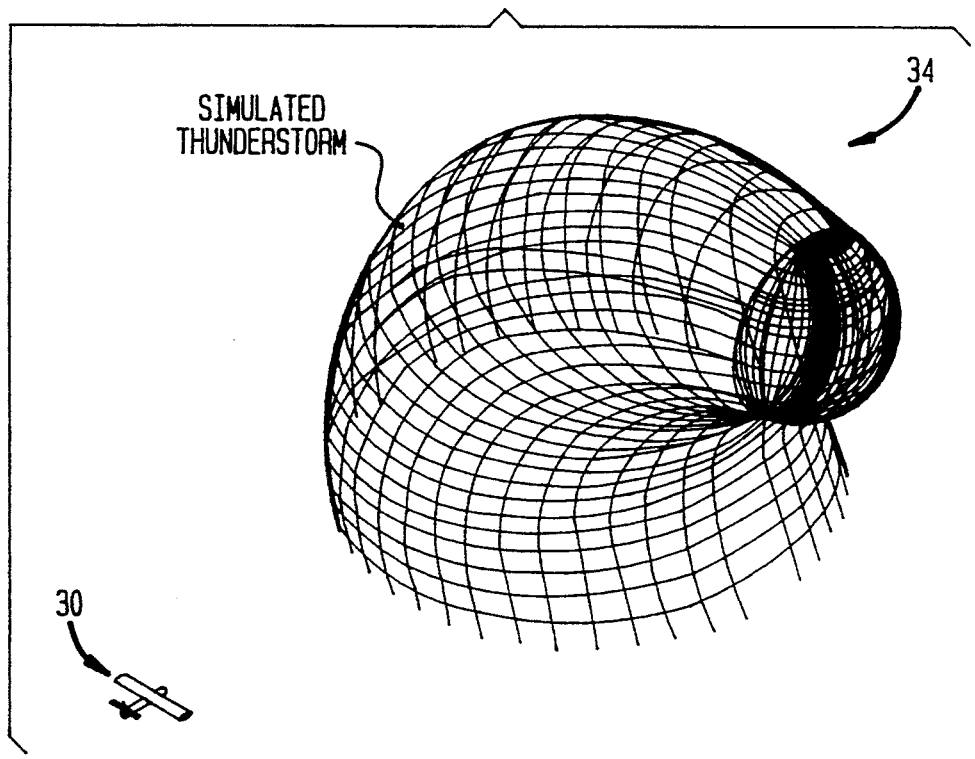
FIGS. 6A–6D are graphical representations showing several views of a weather disturbance, i.e. a typical thunderstorm, for analysis in accordance with the display mode implementation of the invention.
Figure 6B:
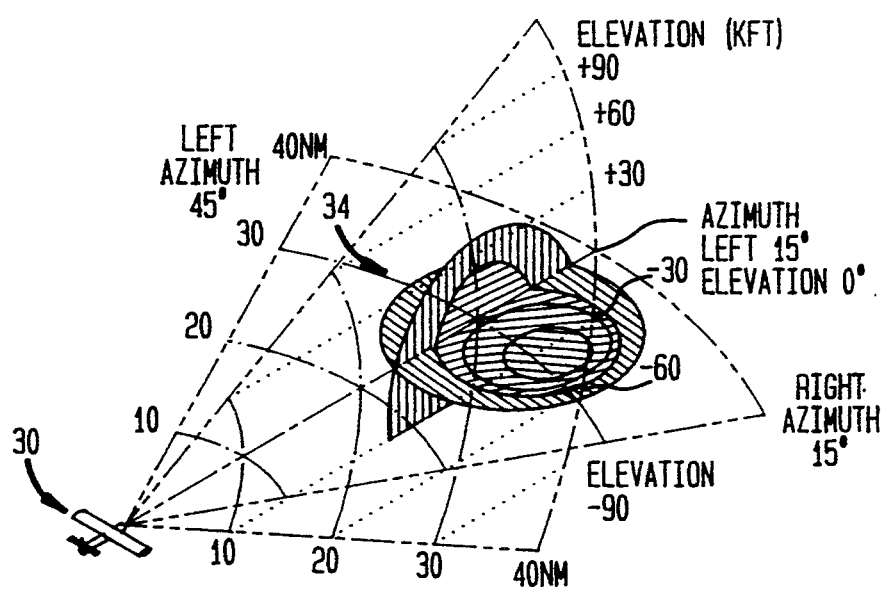
Figure 6C:
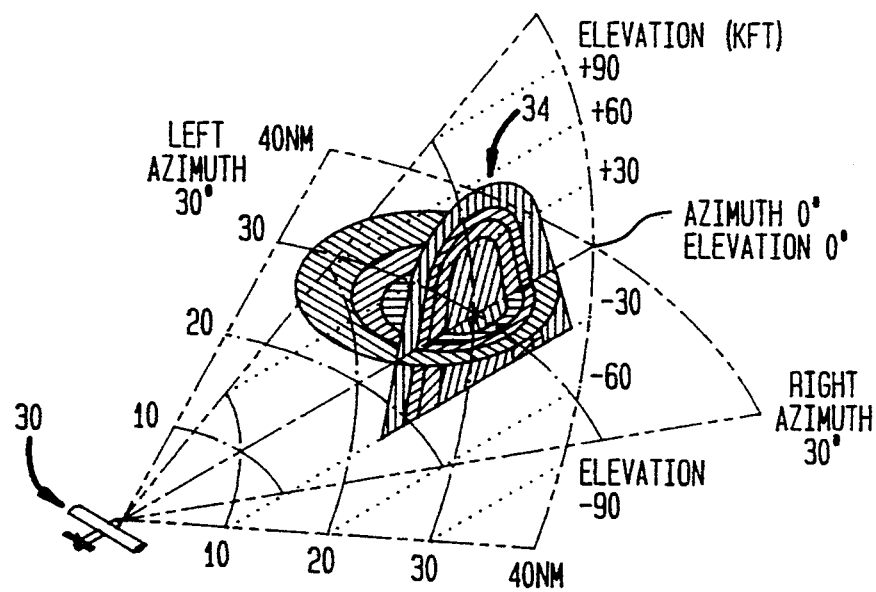
Figure 6D:
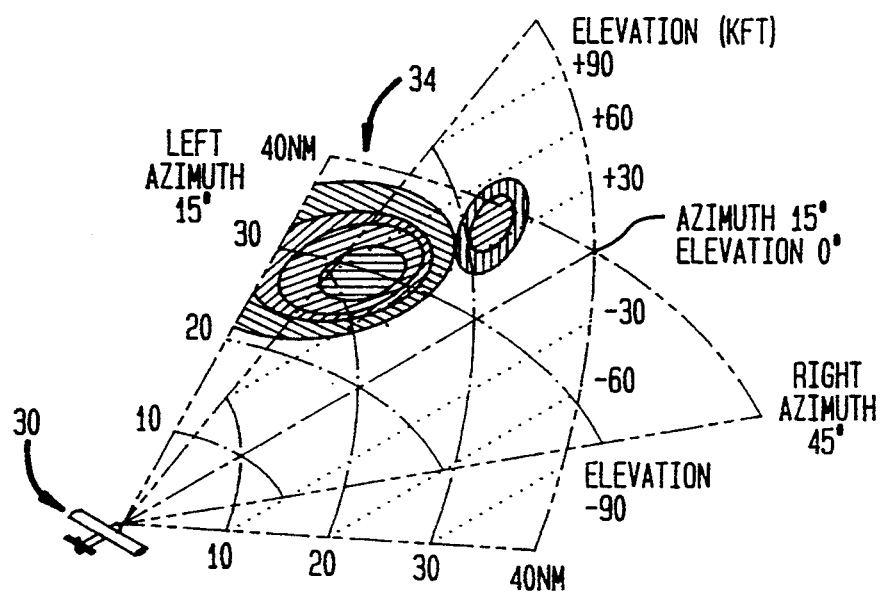

FIGS. 5A and 5B illustrate the option of viewing the weather in either the horizontal or vertical views separately. This allows the user to select via control panel 6 a single view, but still see it in the isometric format.

FIGS. 6A–6D show a series of isometric views of a weather disturbance such as 34 at different azimuth angles, whereby the use of the invention is illustrated. The weather disturbance in the upper left hand view (FIG. 6A) is a simulation of a classical convective thunderstorm. The left 15 degree view (FIG. 6B) shows low altitude and fairly light rainfall. The 0 degree azimuth (FIG. 6C) view shows moderately high altitude and also heavy rainfall. The right 15 degree view (FIG. 6D) shows a high altitude reflectivity with the horizontal radar return back to the left.

With these views the user's analysis of the displayed weather disturbance 34 may be, for example, that the older (and more safe route) part of the storm is straight ahead. Finally the building (possibly most dangerous) part of the storm is to the right. The high altitude reflection may be from hail and there could well be high turbulence at the leading edge of the storm.

There has thus been described a weather radar display mode implementation which combines a horizontal plan view with a vertical side view of a weather disturbance into a single axonometric display. Desired azimuth and elevation angles for the center of the axonometric display can be user selected via a control panel and the user can select which of the four quadrants of the display is to be emphasized. Further, either the plan view or the side view can be separately displayed in the axonometric format. Also, the axonometric display is user selectable for activation on demand, with the conventional display being readily available. The display mode described minimizes time for interpretation, as is a distinct advantage for the purposes described.

With the above description of the invention in mind, reference is made to the claims appended hereto for a definition of the scope of the invention.

What is claimed is:

1. A radar system axonometric display mode implementation, comprising:

control panel means which is user operable for selecting a particular axonometric mode of operation;

control means connected to the control panel means and responsive to the selected particular axonometric mode of operation for providing serial control data and first and second control outputs relating to the axonometric mode of operation;

radar system antenna/transmitter/receiver (ART) means connected to the control means and responsive to the serial control data therefrom for alternately scanning a horizontal plan view and a vertical side view of a target and for transmitting serial data relating to target reflectivity for each of the horizontal plan and vertical side views;

clock means connected to the control means and controlled by the first control output therefrom for providing first, second and third clock outputs;

data buffer means connected to the ART means and the clock means and responsive to the first clock output for temporarily storing the target related data transmitted by the ART means;

memory means connected to the data buffer means, the control means and the clock means and responsive to the second control output and the second clock output for storing the data temporarily stored by the data buffer means in a distance and angle format;

first converter means connected to the memory means, and the control means and responsive to the second control output for converting the data stored by the memory means in a distance and angle format to a rectangular format;

second converter means connected to the first converter means and the control means and responsive to the second control output for converting the data in a rectangular format to an axonometric format;

first screen memory means connected to the second converter means, the control means and the clock means and responsive to the second control output and the third clock output for storing the data in an axonometric format; and display means connected to the screen memory means and responsive to the data stored in the axonometric format for displaying said data as an axonometric view of the target.

2. An implementation as described by claim 1, including:

second screen memory means connected to the second converter means, the control means and the clock means and responsive to the second control output and the third clock output for storing the data in the axonometric format from the first converter means;

multiplexing means connected to the first and second screen memory means, the control means and the display means and responsive to the second control output for switching said display means between said first and second screen memory means, whereby the display means is alternately updated by said first and second screen memory means to prevent displaying a partially formed axonometric view of the target.

3. An implementation as described by claim 1, wherein the memory means includes:

a horizontal plan view memory and a vertical side view memory; and said horizontal plan view memory and said vertical side view memory each connected to the buffer means, the control means and the clock means and responsive to the second control output and the second clock output for storing horizontal plan view data and vertical side view data, respectively, in the distance and angle format.

4. An implementation as described by claim 3, wherein the first converter means includes:

a first polar converter connected to the horizontal plan view memory and the control means and responsive to the second control output for converting the horizontal plan view data in the distance and angle format to a rectangular format; and a second polar converter connected to the vertical side view memory and the control means and responsive to the second control output for converting the vertical side view data in the distance and angle format to a rectangular format.

5. An implementation as described by claim 4, wherein the second converter means includes:

a first axonometric converter connected to the first polar converter and the control means and responsive to the second control output for converting the data from the first polar converter in a rectangular format to an axonometric format; and a second axonometric converter connected to the second polar converter and the control means and responsive to the second control output for converting the data from the second polar converter in a rectangular format to an axonometric format.

6. An implementation as described by claim 5, wherein:

the first screen memory means is connected to the first and second axonometric converters, the control means and the clock means and is responsive to the second control output and the third clock output for storing the data from said first and second axonometric converters in the axonometric format; and the second screen memory means is connected to the first and second axonometric converters, the control means and the clock means and is responsive to the second control output and the third clock output for storing the data from said first and second axonometric converters in the axonometric format.

7. An implementation as described by claim 2, wherein the memory means includes:
a horizontal plan view memory and a vertical side view memory; and
said horizontal plan view memory and said vertical side view memory each connected to the buffer means, the control means and the clock means and responsive to the second control output and the second clock output for storing horizontal plan view data and vertical side view data, respectively, in the distance and angle format.

8. An implementation as described by claim 7, wherein the first converter means includes:
a first polar converter connected to the horizontal plan view memory and the control means and responsive to the second control output for converting the horizontal plan view data in the distance and angle format to a rectangular format; and
a second polar converter connected to the vertical side view memory and the control means and responsive to the second control output for converting the vertical side view data in the distance and angle format to a rectangular format.

9. An implementation as described by claim 8, wherein:
the second screen memory means is connected to the first and second axonometric converters, the control means and the clock means and is responsive to the second control output and the third clock output for storing the data in the axonometric format from the first and second axonometric converters.

10. An implementation as described by claim 1, wherein:
the selected particular mode of operation is an isometric mode.

11. A method for providing a radar system axonometric display mode, comprising:
selecting a particular axonometric mode of operation;
providing serial control data relating to the selected axonometric mode of operation;
transmitting the serial control data to a radar system antenna/transmitter/receiver (ART) for initiating scanning by said ART of horizontal plan and vertical side views of a target;
transmitting serial data relating to target reflectivity for each of the horizontal plan and vertical side views;
temporarily storing the transmitted target related data;
storing the temporarily stored data in a distance and angle format;
converting the data stored in a distance and angle format to a rectangular format;
converting the data in a rectangular format to an axonometric format;
storing the data in an axonometric format; and
displaying the data in an axonometric format on a display as an axonometric view of the target.

12. A method as described by claim 11, including:
displaying the data in an axonometric format on an other display as an axonometric view of the target; and
switching the displayed data from the first mentioned display to the other display for alternately updating said first mentioned and said other displays to prevent displaying a partially formed axonometric view of the target.

13. A method as described by claim 11, wherein storing the temporarily stored data in a distance and angle format includes:
storing the horizontal plan view data in a distance and angle format in a plan view memory; and
storing the vertical side view data in a distance and angle format in a vertical view memory.

14. A method as described by claim 11, wherein converting the data in a distance and angle format to a rectangular format includes:
converting the horizontal plan view data in a distance and angle format to data in a rectangular format using one polar converter; and
converting the vertical side view data in a distance and angle format to data in a rectangular format using an other polar converter.

15. A method as described by claim 11, wherein converting the data in a rectangular format to an axonometric format includes:
converting the horizontal plan view data in a rectangular format to an axonometric format using one axonometric converter; and
converting the vertical side view data in a rectangular format to an axonometric format using an other axonometric converter.

16. A method as described by claim 11, wherein selecting a particular axonometric mode of operation includes:
selecting an isometric mode of operation.

17. A method as described by claim 11, wherein selecting a particular axonometric mode of operation includes:
selecting a particular quadrant of an axonometric display view.

18. A method as described by claim 11, wherein selecting a particular axonometric mode of operation includes:
orienting an axonometric display view at four different angles.

19. A method as described by claim 11, wherein selecting a particular axonometric mode of operation includes:
selecting one of the horizontal plan and vertical side views separately as an axonometric display view.

* * * * *